United States Patent [19]

Nichols et al.

[11] Patent Number: 5,690,855
[45] Date of Patent: Nov. 25, 1997

US005690855A

[54] POLYOL BLEND, CELLULAR POLYURETHANE FOAM PRODUCT MADE THEREFROM, AND HALOGENATED HYDROCARBON-FREE PROCESS THEREFOR

[75] Inventors: Charles B. Nichols, New Milford; Michael R. Sandner, Newtown; Richard R. Zielinski, II, New Milford, all of Conn.

[73] Assignee: Sealed Air Corporation, Saddle Brook, N.J.

[21] Appl. No.: 180,086

[22] Filed: Jan. 11, 1994

[51] Int. Cl.$^6$ ............... C08J 9/08; C08G 18/48
[52] U.S. Cl. ............... 252/182.27; 252/182.25; 252/182.28; 521/110; 521/117; 521/130; 521/132; 521/140; 521/175
[58] Field of Search ............... 252/182.27, 182.28, 252/182.25; 521/110, 117, 132, 140, 175, 130

[56] References Cited

U.S. PATENT DOCUMENTS

| | | | |
|---|---|---|---|
| 3,265,641 | 8/1966 | Wismer et al. | 521/175 |
| 3,369,014 | 2/1968 | Booth | 521/175 |
| 3,442,888 | 5/1969 | Degginger et al. | 521/175 |
| 3,454,504 | 7/1969 | Murai et al. | 521/132 |
| 3,509,077 | 4/1970 | Shultz | 521/175 |
| 3,558,529 | 1/1971 | Whitman et al. | 521/175 |
| 3,865,806 | 2/1975 | Knodel | 521/175 |
| 3,965,052 | 6/1976 | Iwasaki | 521/107 |
| 4,105,599 | 8/1978 | Naka et al. | 521/175 |
| 4,230,824 | 10/1980 | Nodelman | 521/167 |
| 4,272,619 | 6/1981 | Balle et al. | 521/169 |
| 4,273,882 | 6/1981 | Raynor | 521/110 |
| 4,323,658 | 4/1982 | Speranza et al. | 521/174 |
| 4,394,491 | 7/1983 | Hoffman | 525/452 |
| 4,442,238 | 4/1984 | Zimmerman et al. | 521/164 |
| 4,536,522 | 8/1985 | Grigsby, Jr. et al. | 521/172 |
| 4,575,520 | 3/1986 | Kapps et al. | 521/175 |
| 4,637,893 | 1/1987 | Reichel et al. | 521/174 |
| 4,673,696 | 6/1987 | Tsai | 521/172 |
| 4,868,223 | 9/1989 | Nelson et al. | 521/122 |
| 4,897,431 | 1/1990 | Scherzer et al. | 521/172 |
| 4,923,904 | 5/1990 | Hasegawa et al. | 521/115 |
| 4,943,597 | 7/1990 | Grünbauer et al. | 521/167 |
| 5,064,873 | 11/1991 | Snider et al. | 521/131 |
| 5,091,438 | 2/1992 | Tairaka et al. | 521/175 |
| 5,143,941 | 9/1992 | Rossio et al. | 521/174 |
| 5,169,872 | 12/1992 | Petroff et al. | 521/112 |
| 5,169,875 | 12/1992 | Nakamura et al. | 521/155 |
| 5,173,517 | 12/1992 | Kuroishi et al. | 521/166 |
| 5,177,119 | 1/1993 | Motte | 521/175 |
| 5,250,579 | 10/1993 | Smits et al. | 521/98 |
| 5,373,030 | 12/1994 | Kaplan et al. | 521/173 |
| 5,478,494 | 12/1995 | Lee et al. | 252/182.25 |

FOREIGN PATENT DOCUMENTS

| | | |
|---|---|---|
| 0 408 048 A2 | 1/1991 | European Pat. Off. |
| 43 03 809 A1 | 8/1994 | Germany. |
| 704950 | 12/1979 | Russian Federation. |
| 2 220 670 | 1/1990 | United Kingdom. |

*Primary Examiner*—Rabon Sergent
*Attorney, Agent, or Firm*—The Bell Seltzer Intellectual Property Group of Alston & Bird LLP

[57] ABSTRACT

A polyol blend is disclosed for making cellular polyurethane foam products in the absence of halogenated hydrocarbon blowing agents. The products have good insulating performance, good compressive strength, and excellent dimensional stability. The blend comprises first and second polyols and is suitable for one-shot and two component reaction systems. The first polyol is the reaction product of one or more alkylene oxides and a compound selected from the group consisting of aliphatic diols, triols, pentaerythritol, water in an amount sufficient to form a diol upon reaction with alkylene oxide, and mixtures thereof. The second polyol is the reaction product of one or more alkylene oxides and, in the absence of polyol precursor compounds containing amine moieties, a compound selected from the group consisting of carbohydrates, a mixture of carbohydrates, and a mixture of one or more carbohydrates and one or more compounds selected from the group consisting of aliphatic diols, triols, water in an amount sufficient to form a diol upon reaction with alkylene oxide, and mixtures thereof.

46 Claims, No Drawings

5,690,855

POLYOL BLEND, CELLULAR POLYURETHANE FOAM PRODUCT MADE THEREFROM, AND HALOGENATED HYDROCARBON-FREE PROCESS THEREFOR

FIELD OF THE INVENTION

This invention relates to a polyol composition; a rigid, cellular, polyurethane foam product; and a process for producing rigid, cellular, polyurethane foam products by reacting a polyol composition with an organic polyisocyanate. More specifically, this invention relates to the preparation of rigid, cellular, polyurethane foam products without the use of halogenated hydrocarbon blowing agents or other similar volatile hydrocarbon blowing agents.

BACKGROUND OF THE INVENTION

Cellular polyurethane foams typically are produced by the condensation reaction of a polyisocyanate and a hydroxyl containing material. A polyol, which contains multiple hydroxyl groups, is treated with a polyisocyanate in the presence of water and a catalyst. The catalyst typically is one of the amines, tin soaps, or organic tin compounds. As the polyurethane polymer forms, the water reacts with the isocyanate radicals to cause cross linking, and also produces carbon dioxide, which causes foaming. Fluorocarbons, chlorofluorocarbons, other halogenated hydrocarbons, and similar volatile hydrocarbons typically are used as blowing agents to produce an acceptable cellular structure.

Cellular polyurethane foams normally are classified as flexible or rigid. Flexible foams are used for seat cushions, carpet underlays, and the like. Flexible foams generally are based on polyhydroxyl polyol precursor compounds having from two to three reactive hydroxyl moieties, which are known as diols and triols and are said to a have a functionality of from 2 to 3, respectively. Flexible foams can be characterized by their change in resistance to compression as a compressive force is exerted.

Rigid foams are used for building and insulation, marine flotation, lightweight structural components such as automobile bumpers, and the like. Rigid foams generally are based on polyhydroxyl polyol precursor compounds having a functionality in excess of three, which is more than three reactive hydroxyl moieties. These compounds include those that are sometimes referred to as the sugar alcohols and include compounds such as sorbitol, methylglucoside, and sucrose. Dimensional stability, compressive strength, and insulation performance are among the more important properties by which rigid foams are judged.

Numerous polyols and combinations of various polyols have been proposed for use in the manufacture of cellular polyurethane foam products. For example, Hasegawa et al. U.S. Pat. No. 4,923,904 discloses that semi-rigid polyurethane foams can be produced from a raw material that contains polyols, organic isocyanates, catalysts and blowing agents. Amine initiated polyols are included, which are polyols formed from precursor compounds that contain amine moieties and therefor are self-catalyzed for reaction with isocyanate moieties. FREON is exemplified as a blowing agent.

Some polyol formulations have been disclosed for use in the preparation of rigid polyurethane foams that are said to reduce or substantially to eliminate the use of halogenated hydrocarbons as blowing agents. For example, Raynor U.S. Pat. No. 4,273,882 discloses a polyol composition that is said to be useful for preparing a foam that is expanded based entirely on water and avoiding the use of FREON. The polyol blend comprises a main polyol and first and second supplemental polyols. At least the main and second supplemental polyols are amine initiated polyols. A relatively large amount of water and excess of isocyanate is used to prepare the polyurethane foam. However, practice of the invention is said to overcome problems ordinarily encountered in using a relatively high water content in the foam reaction mixture, such as brittleness, high friability, and low compressive strength.

Grünbauer et al. U.S. Pat. No. 4,943,597 discloses a high functionality, high molecular weight polyol composition that is said to be useful for preparing polyurethane foams with a minimum or no halogenated hydrocarbon blowing agent. Suitable polyol initiators are said to include carbohydrate compounds and aromatic amines. Diols and triols are disclosed to be useful in the composition only to the extent that the functionality of the blend remains at least four or more. Several examples are shown in which Refrigerant 11, FREON, is used as a blowing agent. Examples showing preparation of polyurethane foams without the use of halogenated hydrocarbon blowing agents are based on polyol compositions that are primarily sucrose initiated and could be expected to be viscous and difficult to process in the absence of viscosity reducing agents. In one example, a small amount of poly(propylene) product of equivalent weight 500 is disclosed in admixture with a sucrose initiated polyol.

The amine moieties typically contained in many polyol compositions used for preparing polyurethane foams are reactive with the isocyanate radical. Some of these foams can even be produced without the use of catalyst by relying on the reactivity of the amine initiated polyol with the isocyanate radical. However, the reaction is difficult to control and the results are somewhat unpredictable. The polycondensation reaction generally takes place simply on mixing of the components and is often so fast that reaction conditions need to be controlled in a somewhat narrow range to produce a foam having desirable dimensional stability, insulation value, and compressive strength, or even to produce a foam at all. This difficulty is increased when substantial amounts of water are present because water in excess of that necessary for the polycondensation reaction vaporizes to expand the polyurethane, sometimes exploding a substantial portion of the cells. The use of excess water can cause increased friability, low compressive strength, and a high open cell content in otherwise closed cell foams.

As shown in the art, rigid foams based entirely on water have been attempted but are problematic. Rigid foams typically are produced using some halogenated hydrocarbon or other similar volatile blowing agent. Use of halogenated hydrocarbon blowing agents, especially the fluorocarbons, predictably expands the cellular structure of the foam despite the presence of amine containing moieties in the polyol blend. Halogenated hydrocarbon blowing agents provide a high content of closed, fine cells in foams having acceptable compressive strength with high insulation value and dimensional stability. Dimensional stability is enhanced because the halogenated hydrocarbons typically do not readily diffuse out of the cells of the foam, but remain in the cells to counterbalance atmospheric pressure. Insulation value is enhanced because the halogenated hydrocarbon compounds typically are poor thermal conductors. However, despite the advantages of halogenated hydrocarbon blowing agents, their use generally is considered undesirable.

SUMMARY OF THE INVENTION

The invention provides a polyol blend that is useful for preparing cellular polyurethane foam products having the characteristics of rigid foam. The polyol blend can be made in the absence of amine initiators that unpredictably impact the catalytic activity of the blend. The polyol blend can be used in processes for producing polyurethane foam in the absence of halogenated hydrocarbon blowing agents or other similar volatile blowing agents and without using excessive amounts of water or polyisocyanate precursor. The expanded products have at least acceptable compressive strength and insulation performance and excellent dimensional stability over a wide range of temperature conditions in both open cell and closed cell forms.

The polyol blend comprises first and second polyols. The first polyol is the reaction product of one or more alkylene oxides and an aliphatic diol, triol, pentaerythritol, or mixtures thereof. Also, the first polyol can comprise water in an amount sufficient to form a diol upon reaction with alkylene oxide. Water first reacts with alkylene oxide to form the diol, and then the diol further reacts with the alkylene oxide to form the first polyol.

More specifically, the first polyol comprises a polyether polyol having a functionality of from about 2 to 4, a hydroxyl number of from about 100 to 500, and an equivalent weight of from about 110 to 560.

Generally, the first polyol is present in the blend in an amount of from about 20 to 80 percent by weight of the blend. More specifically, the first polyol is present in an amount of from about 35 to 75 percent by weight of the blend; still more specifically, from about 45 to 70 percent by weight of the blend; yet more specifically, 60 to 70 percent by weight of the blend.

The second polyol is the reaction product of one or more alkylene oxides and, typically, a carbohydrate or mixture of carbohydrates. One or more compounds can also be included that are selected from aliphatic diols, triols, water in an amount sufficient to form a diol upon reaction with alkylene oxide, and mixtures thereof.

In a more specific embodiment, the second polyol also is a polyether polyol and has an average functionality of from about 4 to 8, a hydroxyl number of from about 200 to 600, and an equivalent weight of from about 90 to 280.

The polyol blend has an average functionality of from about 3 to 5, an average hydroxyl number of from about 200 to 400, and an average equivalent weight of from about 140 to 280. Typically, the blend will have an average functionality of about 3.5 and the first and second polyols will be present in a ratio of the first polyol to the second polyol of from about 1.5:1 to 2.5:1.

In still further embodiments, the blend can comprise one component of a two component system for reaction with polyisocyanate to produce polyurethane foam. The blend can comprise one or more urethane catalysts, one or more foam stabilizing agents, and water in an amount sufficient to provide a blowing agent on reaction of the blend with diisocyanate to expand the resulting polyurethane to provide a cellular foam product. Typically, water will be present in the blend in an amount of from about 2 to 8 percent by weight based upon the total weight of the blend. Cell opening agents can be incorporated for the manufacture of open cell foams.

Foam stability may be enhanced by the addition to the polyol blend of alkylphenol alkoxylates such as nonylphenol ethoxylate. Typical silicone surfactants are also contemplated as cell stabilizing agents.

The invention includes a process for preparing a rigid, cellular, polyurethane foam product in which the polyol blend of the invention is reacted with an organic polyisocyanate reactant in the presence of water, one or more urethane catalysts, and one or more foam stabilizing agents so that about 0.8 to 1.5 isocyanate groups are provided per active hydroxyl group. The reaction can be conducted in the absence of halogenated hydrocarbon blowing agents. The components can be supplied separately to a single mixing head for reacting. Alternatively, various combinations of nonisocyanate components, including water, catalyst, foam stabilizing agent, cell opening agent, and polyols, can comprise the polyol blend and be supplied separately from the isocyanate component to a single mixing head for reacting.

The invention also includes a rigid, cellular, polyurethane foam product that comprises the reaction product of a polyisocyanate and the polyol blend of the invention. The foam product typically will have a density of from about 0.6 to 4 pounds per cubic foot. Insulating and compressive strength properties render the foam suitable for use as blocking and bracing for building materials and for insulation of various types. Closed cell foams generally provide better insulation performance. Open cell foams typically can be used for insulation in less demanding environments such as containers for temporary food storage. The cellular polyurethane foam product can be made with a closed cell content of at least about 80 percent or with an open cell content of at least about 95 percent.

DETAILED DESCRIPTION OF THE INVENTION

The polyol blend of the invention comprises a mixture of first and second, commercially available polyols that can be made into a rigid, cellular, polyurethane foam product having good insulating characteristics, sufficient compressive strength, and excellent dimensional stability in the absence of halogenated hydrocarbon or other volatile hydrocarbon blowing agents.

The first polyol is the reaction product of one or more alkylene oxides and a compound selected from the group consisting of aliphatic diols, triols, pentaerythritol, water in an amount sufficient to form a diol upon reaction with alkylene oxide, and mixtures thereof. The aliphatic diols and triols typically are selected from the group consisting of ethylene glycol, propylene glycol, 1,3-butylene glycol, 1,4-butylene glycol, 2,3-butylene glycol, glycerol, trimethylolethane, trimethylolpropane, triethylolpropane, 1,2,6-hexane triol, and mixtures thereof. The butylene glycols sometimes are also referred to as butane diols. The alkylene oxides normally are selected from the group consisting of ethylene oxide, propylene oxide, butylene oxide, and mixtures thereof. Ethylene oxide, propylene oxide, and mixtures of ethylene oxide and propylene oxide are somewhat more typically used.

The first polyol can be present in the blend in an amount of from about 45 to 70 percent by weight of the blend, and specifically from about 60 to 70 percent by weight. Amounts of from about 35 to 75 percent by weight of the blend and from 20 to 80 percent by weight of the blend have also been determined to be useful.

The first polyol generally is a polyether polyol and has an average functionality of from about 2 to 4, a hydroxyl number of from about 100 to 500, and an equivalent weight to from about 110 to 560. Functionality refers to the number of reactive hydroxyl moieties, —OH, that are available for reaction with isocyanate moieties, —NCO. Equivalent weight is a measure of the weight of the polyol that will combine with an isocyanate moiety and expresses a relationship between the molecular weight and the functionality.

Equivalent weight normally is determined mathematically based upon the hydroxyl number, which is an experimentally derived quantity. The hydroxyl number is the number of equivalents of potassium hydroxide, KOH, needed to titrate one gram of the polyol.

A first polyol component of the blend has been found useful in the practice of the invention that is a polyether polyol and has a functionality of about 3, a hydroxyl number of about 238, and an equivalent weight of about 236. The molecular weight of such a polyether polyol normally ranges from about 600 to 800 and molecular weights of from about 600 to 700 have been determined to be useful, normally when present in an amount of from about 60 to 70 percent by weight of the blend.

Typical commercial polyols useful as a first polyol in the blend of the invention include, but are not limited to, Voranol 270, Dow Chemical; Arcol LHT 240, Arco Chemical; Multranol 9157, Miles Chemical; and Poly G 30-240, Olin Chemical.

The second polyol of the polyol blend of the invention is the reaction product of one or more alkylene oxides and, in the absence of polyol precursor compounds containing amine moieties, a compound selected from the group consisting of carbohydrates, a mixture of carbohydrates, and a mixture of one or more carbohydrates and one or more compounds selected from the group consisting of aliphatic diols, triols, water in an amount sufficient to form a diol upon reaction with alkylene oxide, and mixtures thereof. Alkylene oxides similar to those named with respect to the first polyol are also precursor compounds for the second polyol.

A variety of carbohydrates having an average functionality of above about 4 are available. The carbohydrates sucrose, sorbitol, and mixtures of sucrose and sorbitol have been determined to be useful in preparing the cellular polyurethane foam product of the invention. Also determined to be useful in the practice of the invention are fructose, glucose, lactose, maltose, galactose, sorbose, xylose, arabinose, mannose, cellobiose, methyl glucoside, and mixtures thereof, including mixtures with sucrose and sorbitol.

Aliphatic diols and triols that can be used in admixture with one or more carbohydrates include those named earlier with respect to the first polyol. A mixture of glycerol and a compound selected from the group consisting of sucrose, sorbitol, water in an amount sufficient to form a diol upon reaction with alkylene oxide, and mixtures thereof has been determined to be useful.

It may be desirable to incorporate a viscosity reducing agent in the blend, particularly to reduce the viscosity of the second polyol. These viscosity reducing agents typically are diols and triols that have not been reacted with alkylene oxide and generally do not form cross linkages to any great extent on the formation of polyurethane. One useful viscosity reducing agent is glycerol. The glycerol can be present in an amount from about 1 to 5 percent by weight of the second polyol. The glycerol can be separately added to the second polyol or to the polyol blend, or can simply be an unreacted excess component from the precursor compounds for the second polyol.

The second polyol typically will be present in an amount of from about 30 to 55 percent by weight of the blend, more specifically 30 to 40 percent, although useful foams can be prepared with 25 to 65 percent by weight of the second polyol in the blend and also from 20 to 80 percent by weight of the second polyol in the blend.

The second polyol generally will be a polyether polyol having an average functionality of from about 4 to 8, a hydroxyl number of from about 200 to 600, and an equivalent weight of from about 90 to 280. Useful foams have been prepared from a blend comprising such a second polyol where the second polyol has a molecular weight of from about 500 to 900.

More typically, the second polyether polyol will have a functionality of from about 4 to 6, a hydroxyl number of about 525, and an equivalent weight of about 107. A second polyether polyol of molecular weight of about 550 can be present in the polyol blend in an amount of from about 30 to 40 percent by weight of the blend.

Typical commercial polyols useful as second polyols include, but are not limited to, MULTRANOL 9260, Miles Chemical; THANOL R-572, Arco Chemical; POLY G 74-532, Olin Chemical; and EASTMAN R-572, Eastman Chemical Company.

The first and second polyols typically are polyether polyols, but can also comprise polyester polyols. Carboxylic acid groups present in a polyester compound will react with the isocyanate group to yield carbon dioxide and either an amine or an amide. The amino groups present in the amine or the amide can react with additional isocyanate to form cross linkages and to produce a cellular foamed product.

The polyol blend of the invention normally does not include polyol precursor compounds containing amine moieties. The amine moieties are reactive with isocyanate groups and the reaction typically proceeds very quickly, which introduces a degree of unpredictability in the catalytic behavior of the polyol and isocyanate system.

The first and second polyols typically are present in a ratio of the first polyol to the second polyol of from about 1.5:1 to 2.5:1. For these ratios, the polyol blend of first and second polyols typically will have an average functionality of from about 3 to 5, an average hydroxyl number from about 200 to 400, and an average equivalent weight of from about 140 to 280. Useful foams have been prepared from polyol blends having an average functionality of about 3.5 to 4.5, although an average functionality of about 3.5 is somewhat more typical. The average molecular weight of the polyol blend generally is in the range of from about 600 to 800.

The polyol blend can further comprise, in addition to the first and second polyol components, one or more urethane catalysts, one or more foam stabilizing agents, and water in an amount sufficient to provide a blowing agent on reaction of the blend with polyisocyanate to expand the resulting polyurethane to provide a cellular foam product. Water typically is present in an amount to from about 2 to 8 percent by weight based upon the total weight of the blend.

Alkylphenol alkoxylates have been found useful in an amount of from about 2 to 20 percent by weight based upon the total weight of the blend. One specific alkylphenol alkoxylate that has been used is a nonylphenol ethoxylate. The nonylphenol ethoxylate surfactant is a nonionic surface active agent that is ethoxylated with 12 to 13 moles of ethylene oxide. Typical commercial products of this type include but, are not limited to, TERGITOL NP-13, Union Carbide; SULFONIC N-120, Texaco Chemical Company; and IGEPOL CO 720-A, GAF.

Various other surfactants that typically are used in the manufacture of polyurethane foams are contemplated as foam stabilizing agents to assist in stabilizing the foam as it becomes rigid. Any of the typically available surfactants for preparation of polyurethane and polyisocyanurate foams should prove useful in the practice of the invention. Of these, organic silicone surfactants have proved useful. Polyethylene glycol ethers of long chain alcohols, tertiary amine or alkanolamine salts of long chain alkyl acid sulfate esters, alkylsulfonic esters, alkylarysulfonic acids, and others can also be expected to be useful, although not necessarily with equivalent results.

Surfactants are employed in an amount sufficient to stabilize the foaming reaction mixture against collapse and the formation of large, uneven cells. However, use of too much foam stabilizing agent can lead to loss of dimensional stability and shrinkage of the foam. Typically, the surfactants are used in amounts of about 0.2 to about 5 percent by weight of the blend.

One or more urethane catalysts should be included in the reaction mixture, either separately from or as part of the polyol blend so that the polyols will be reactive with the isocyanate moieties. The catalysts normally are typical amine catalysts used for the preparation of polyurethane and modified polyurethane and polyphenylpolyisocyanurate foams. Organometallic compounds, such as organic tin compounds and tin soaps, are also used. Exemplary tertiary amine compounds include triethylenediamine, N-methylmorpholine, pentamethyl-diethylentriamine, dimethylcyclohexylamine, tetramethylethylenediamine, 2-2-(dimethylamino)ethoxy ethanol, 1-methyl-4-dimethylaminoethylpiperazine, 3-methoxy-N-dimethylpropylamine, N-ethylmorpholine, diethylethanolamine, N,N dimethyl-N', N'-dimethylisopropylpropylenediamine, N,N-diethyl-3-diethylaminopropylamine, dimethylbenzylamine and the like. Exemplary organic metallic catalysts include mercury, lead, iron, and tin catalysts, with tin being preferred among these. Suitable organic tin catalysts include tin salts of carboxylic acids such as dibutyltin di-2-ethyl hexanoate, as well as other organic metallic compounds. Metal salts such as stannous chloride can also function as catalyst for the urethane reaction. A catalyst for the trimerization of polyisocyanates, such as an alkali metal alkoxide or carboxylate, may also optionally be employed herein. Such catalysts are used in an amount that measurably increases the rate of reaction of the polyisocyanate. Typical amounts are about 0.01 to about 2 percent by weight of the polyol blend.

If desired, the cellular polyurethane foam product of the invention can be produced in an open cell form by incorporating at least one cell opening agent an amount from about 0.01 to 10% by weight of the blend. Suitable cell opening agents are organic polymers that include liquid, unsaturated, hydrocarbons free of moieties that are reactive with isocyanate groups and wherein these agents have a molecular weight from about 800 to 10,000. Polybutadiene and poly(1-octene), which is sometimes more commonly known as polyoctenylene, having a molecular weight of from about 1,000 to 4,000, are suitable cell opening agents. Other suitable cell opening agents include commercially available compounds from Goldschmidt Chemical of Hopewell, Virginia, such as TEGOSTAB B-8919, TEGOSTAB BC-1280. Also useful are OSi silicone surfactant L-3.001 and others.

In preparing foams by the process according to the invention, the above described polyol composition is reacted with an organic polyisocyanate. Polyisocyanates that are useful in making polyurethanes include aromatic, aliphatic, and cycloaliphatic polyisocyanates and combinations thereof. Representative of these isocyanates are diisocyanates such as m- or p- phenylene diisocyanate, toluene-2,4-diisocyanate, toluene-2,6-diisocyanate, hexamethylene-1,6-diioscyanate, tetramethylene-1,4-diioscyanate, cyclohexane-1,4-diioscyanate, hexahydrotoluene diioscyanate (and isomers), naphthalene-1,5-diioscyanate, 1-methylphenyl-2,4-phenyl diioscyanate, diphenylmethane-4,4'-diioscyanate, diphenylmethane-2-4'-diioscyanate, 4,4'-biphenylene diioscyanate, 3,3'-dimethoxy-4,4'-biphenylene diisocyanate and 3,3'-dimethyldiphenylpropane-4,4'-diisocyanate. Triisocyanates such as toluene-2,4,6-triisocyanate and polyisocynanates such as 4,4'-dimethyldiphenylmethane-2,2'-5'5'-tetraisocyanate and the diverse polymethylenepolyphenylpolyisocyanates are also useful.

A crude polyisocyanate may also be used in making polyurethanes, such as the crude toluene diisocyanate obtained by the phosgenation of a mixture of toluene diamines or the crude diphenylmethane diisocyanate obtained by the phosgenation of crude diphenylmethanediamine.

Especially preferred for making rigid polyurethanes are methylene-bridged polyphenylpolyisocyanates, having an average functionality of about 2 to about 4, and more specifically 2.2 to 2.8 isocyanate moieties per molecule, due to their ability to cross link the polyurethane. The isocyanate index, which is defined as the ratio of equivalents of isocyanates to equivalents of active hydroxyl moieties, is generally from about 0.8 to about 1.5.

In preparing the rigid foam, it is not necessary to use a halogenated hydrocarbon or other similar volatile hydrocarbon blowing agent. Water present in an amount of from about 2 to 8 percent by weight based upon the polyol blend will react with the isocyanate groups to generate carbon dioxide. Carbon dioxide then expands to produce the foam. While not wishing to be bound by theory, it is also believed that some of the water is vaporized and by vaporizing thereby also contributes to expansion of the foam. When no halogenated hydrocarbon or other volatile hydrocarbon blowing agent is used, then the theoretical gas composition of the cells of the foam is over 90 mole percent carbon dioxide. The remaining gases are believed to be water vapor.

The process of preparing the polyurethane cellular foam product of the invention comprises the step of reacting the polyol blend of the invention with an organic polyisocyanate as described above in the presence of water, one or more urethane catalysts, and more or more foam stabilizing agents. The polyisocyanate reactant will typically be used in an amount so as to provide from about 0.8 to 1.5 isocyanate groups per active hydroxyl group.

The polyol blend, water, one or more urethane catalysts, foam stabilizing agent and polyisocyanate can all be separately supplied through separate process lines to a single mixing head for reacting. This is sometimes referred to as the "one shot" process. Normally, the catalysts and water are combined into a single process stream for ease of supplying catalyst to the reaction mixture.

A particularly useful method for practicing the process of the present invention is to use a "two component" system wherein a polyol blend containing the polyols, one or more suitable urethane catalysts, water, surfactants, and any other additives, such as cell opening agents, pigments, colorants, fillers, antioxidants, flame retardants, stabilizers, and the like, are supplied through a single process line to a mixing head where the blend is mixed by impingement with a polyisocyanate reactant that has been separately supplied to the mixing head. The reaction occurs almost simultaneously.

Other methods, such as the pre-polymer method, may also be used in connection with the present invention. In the pre-polymer method, a small portion of the polyol component is reacted with the polyisocyanate in the presence of a small amount of catalyst. The remaining polyol is then added and the reaction is completed.

The following tables illustrate particular embodiments of the invention for a polyol blend comprising a first polyol A and a second polyol B that is reacted with isocyanate in a two component system. Polyol A is a 600 to 700 molecular weight trifunctional polyether polyol with a nominal hydroxyl number of 238 and a nominal equivalent weight of 239.

Polyol B is a 550 molecular weight sucrose-based polyether polyol with a nominal functionality of 5, a nominal hydroxyl number of 525, and nominal equivalent weight of 107.

The organic polymer additive which is shown for examples 2, 4, and 5 is a mixture of organic polymers that has a proprietary composition and is manufactured by Thomas Goldscmidt AG Chemische Fabriken, Essen, Germany and distributed by Goldscmidt Chemical Corporation of Hopewell, Virginia. The trade name of the product is Tegostab®B-8919. Other examples are Tegostab BC-1280, OSi silicone surfactant L-3,001, and mixtures thereof. These are cell opening agents.

Amounts shown for the polyol blend of the two component system are in percent by weight of the polyol blend. Amounts shown for isocyanate are the grams isocyanate added to the two component system per 100 grams of the polyol blend component.

TABLE 1

TYPICAL FORMULATION EXAMPLES

| Polyol Blend No. | 1 | 2 | 3 | 4 | 5 |
|---|---|---|---|---|---|
| Polyol A | 60.00 | 60.00 | 50.00 | 49.80 | 59.00 |
| Polyol B | 30.40 | 30.30 | 29.10 | 29.00 | 34.40 |
| Nonylphenol ethoxylate | 5.00 | 5.00 | 15.00 | 15.00 | — |
| Water | 3.30 | 3.30 | 3.40 | 3.40 | 3.60 |
| Catalyst | 0.80 | 0.80 | 1.25 | 1.25 | 1.35 |
| Catalyst | — | — | 0.25 | 0.25 | 0.35 |
| Surfactant | 0.50 | 0.50 | 1.00 | 1.00 | 1.00 |
| Organic Polymers | — | 0.10 | — | 0.30 | 0.30 |
| Polyol avg. functionality | 3.41 | 3.40 | 3.41 | 3.03 | 3.59 |
| Polyol avg. molecular weight | 557 | 557 | 557 | 483 | 573 |
| Polyol avg. equivalent weight | 176 | 176 | 176 | 150 | 178 |
| Polyol avg. hydroxyl number | 302 | 301 | 302 | 271 | 321 |
| Isocyanate | 139.00 | 139.00 | 135.00 | 135.00 | 135.00 |
| Index | 1.15 | 1.15 | 1.15 | 1.15 | 1.04 |
| Mole percent of $CO_2$ - of theoretical total cell gas | >90 | >90 | >90 | >90 | >90 |

TABLE II

TYPICAL PHYSICAL PROPERTIES

| | 1 | 2 | 3 | 4 | 5 |
|---|---|---|---|---|---|
| Cream Time, sec. | 7 | 7 | 5 | 5 | 5 |
| Rise Time, sec.. | 104 | 110 | 65 | 65 | 55 |
| Tack Free Time, sec. | 140 | 145 | 62 | 60 | 55 |
| Free Rise Core Density, pcf. | 1.8 | 1.8 | 1.4 | 1.4 | 1.3 |
| Free Rise Tub Density, pcf. | 2.1 | 2.0 | 1.9 | 1.9 | 1.8 |
| Compressive Strength | | | | | |

TABLE II-continued

TYPICAL PHYSICAL PROPERTIES

| | 1 | 2 | 3 | 4 | 5 |
|---|---|---|---|---|---|
| ‖ to rise, psi, 50% deflection | 20 | 25 | 12 | 15 | 17 |
| ⊥ to rise, psi, 50% deflection | 15 | 17 | 8 | 10 | 12 |
| k Factor, aged | | | | | |
| BTU × in./ft² × hr. × °F. | 0.268 | 0.272 | N.E. | 0.296 | 0.300 |
| Closed Cell Content, %* | 87.21 | 84.59 | ≈80 | 0.26 | 2.51 |
| Open Cell Content, %* | 9.85 | 15.99 | N.E. | 98.48 | 95.58 |
| Friabiity, weight % | 16.29 | 13.78 | 23.40 | 42.74 | 40.51 |
| Dimensional Stability** | | | | | |
| • −40° F./°C., cold box | E | E | E | E | E |
| • 70° F., ambient | G | E | F–P | E | E |
| • 140° F., oven | E | E | VG | E | E |
| • 157° F., 95% R.H. | F | E | P | E | E |

NOTES:
N.E. = Not Evaluated
* Values for closed and open cell content are corrected values incorporating the calculated percent attributed to the foam cell walls and thus do not necessarily total to 100%. However, such is the accepted methodology in the polyurethane industry.
** E = excellent, VG = very good, G = good, F = fair, P = poor. These tests were conducted over 24 hours, then 2 weeks, and, finally, 4 weeks.

As can be seen from the above examples, dimensionally stable foams with good dimensional stability, compressive strength, and insulating ability were obtained for both open cell and closed cell foams, although the insulation factor was somewhat better for the closed cell foam than for the open cell foam. No halogenated hydrocarbon or other hydrocarbon blowing agent whatsoever was used.

The invention claimed herein has been described with respect to particular exemplified embodiments. However, the foregoing description is not intended to limit the invention to the exemplified embodiments, and the skilled artisan should recognize that variations can be made within the spirit and scope of the invention as described in the foregoing specification. The invention includes all alternatives, modifications, and equivalents that can be included in the true spirit and scope of the invention as described by the appended claims.

What is claimed is:

1. A polyol blend comprising, in the absence of amine initiated polyols:

a) water in an amount of from about 2 to 8 percent by weight based upon the total weight of said blend;

b) a first polyol that is the reaction product of one or more alkylene oxides and a compound selected from the group consisting of aliphatic diols, aliphatic triols, pentaerythritol, water in an amount sufficient to form a diol upon reaction with alkylene oxide, and mixtures thereof, wherein said first polyol has a functionality of from about 2 to 4, a hydroxyl number of from about 100 to 500; and an equivalent weight of from about 110 to 560; and c) a second polyol that is the reaction product of one or more alkylene oxides and a compound selected from the group consisting of carbohydrates, a mixture of carbohydrates, and a mixture of one or more carbohydrates and one or more compounds selected from the group consisting of aliphatic diols, aliphatic triols, water in an amount sufficient to form a diol upon reaction with alkylene oxide, and mixtures thereof, wherein said second polyol has an average functionality of from about 4 to 8, a hydroxyl number of from about 200 to 600, and an equivalent weight of from about 90 to 280, and wherein said first and second polyols are present in said blend in a ratio by weight to said first polyol to said second polyol of from about 1.5:1 to 2.5:1 sufficient for preparation of dimensionally stable polyurethane foams in the absence of halogenated hydrocarbon blowing agents.

2. The polyol blend of claim 1 wherein said aliphatic diols and triols are selected from the group consisting of ethylene glycol, propylene glycol, 1,3-butylene glycol, 1,4-butylene glycol, 2,3-butylene glycol, glycerol, trimethylolethane, trimethylolpropane, triethylolpropane, 1,2,6-hexane triol, and mixtures thereof.

3. The polyol blend of claim 1 wherein said first polyol is present in the blend in an amount of from about 35 to 75 percent by weight of the blend.

4. The polyol blend of claim 1 wherein said first polyol is present in the blend in an amount of from about 45 to 70 percent by weight of the blend.

5. The polyol blend of claim 1 wherein said alkylene oxides are selected from the group consisting of ethylene oxide, propylene oxide, butylene oxide, and mixtures thereof.

6. The polyol blend of claim 1 wherein said alkylene oxide is selected from the group consisting of ethylene oxide, propylene oxide, and mixtures thereof.

7. The polyol blend of claim 1 wherein said carbohydrate is selected from the group consisting of fructose, sucrose, glucose, lactose, maltose, galactose, sorbose, xylose, arabinose, mannose, cellobiose, sorbitol, methyl glucoside, and mixtures thereof.

8. The polyol blend of claim 1 wherein said carbohydrate is selected from the group consisting of sucrose, sorbitol, and mixtures thereof.

9. The polyol blend of claim 1 wherein said mixture of one or more carbohydrates and one or more compounds selected from the group consisting of aliphatic diols, aliphatic triols, water in amount sufficient to form a diol upon reaction with alkylene oxide, and mixtures thereof comprises a carbohydrate selected from the group consisting of sucrose sorbitol, and mixtures thereof and a compound selected from the group consisting of glycerol, water in an amount sufficient to form a diol upon reaction with alkylene oxide, and mixtures thereof.

10. The blend of claim 1 wherein at least one of said first and second polyols also comprises polyester polyols.

11. The polyol blend of claim 1 wherein said first polyol is present in the blend in an amount of from about 20 to 80 percent by weight of the blend.

12. The polyol blend of claim 1 wherein said first polyol is present in the blend in an amount of from about 60 to 70 percent by weight of the blend.

13. The blend of claim 1, said blend having an average functionality of from about 3 to 5, an average hydroxyl number of from about 200 to 400, and an average equivalent weight of from about 140 to 280.

14. The blend of claim 13, said blend having an average molecular weight of from about 600 to 800.

15. The blend of claim 1, said blend having an average functionality of from about 3.5 to 4.5.

16. The blend of claim 1, said blend having an average functionality of about 3.5.

17. The blend of claim 1 wherein said first polyether polyol has a molecular weight of from about 600 to 800; and wherein said second polyether polyol has a molecular weight of from about 500 to 900.

18. The blend of claim 1 wherein said first polyether polyol has a functionality of about 3, a hydroxyl number of about 238, and an equivalent weight of about 236.

19. The blend of claim 18 wherein said first polyether polyol has a molecular weight of about 600 to 700.

20. The blend of claim 19 wherein said first polyether polyol is present in an amount of from about 60 to 70 percent by weight of said blend.

21. The blend of claim 18 wherein said second polyether polyol has a functionality of from about 4 to 6, a hydroxyl number of about 525, and an equivalent weight of about 107.

22. The blend of claim 21 wherein said second polyether polyol has a molecular weight of about 550.

23. The blend of claim 22 wherein said second polyether polyol is present in an amount of from about 30 to 40 percent by weight of said blend.

24. The blend of claim 1 further comprising one or more urethane catalysts and one or more foam stabilizing agents.

25. The blend of claim 24 further comprising one or more alkylphenol alkoxylates in an amount of from about 2 to 20 percent by weight based upon the total weight of said blend.

26. The blend of claim 25 wherein said alkylphenol alkoxylates comprise at least one nonylphenol ethoxylate.

27. The blend of claim 24 wherein said foam stabilizing agents are surfactants and are present in an amount of from about 0.2 to 5 percent by weight based upon the total weight of said blend.

28. The blend of claim 27 wherein said surfactants are organic silicone surfactants.

29. The blend of claim 24 further comprising at least one cell opening agent in an amount of from about 0.01 to 10.0 percent by weight of said blend.

30. The blend of claim 29 wherein said cell opening agent is a liquid, unsaturated, hydrocarbon free of moieties that are reactive with isocyanate groups, and wherein said agent has a molecular weight of from about 800 to 10,000.

31. The blend of claim 30 wherein said cell opening agent has a molecular weight of from 1,000 to 4,000 and is selected from the group consisting of polybutadiene and polyoctenylene.

32. The blend of claim 24 wherein said second polyol further comprises at least one viscosity reducing agent.

33. The blend of claim 32 wherein said viscosity reducing agent is glycerol and said glycerol is present in an amount of from about 1 to 5 percent by weight of said second polyol.

34. A polyether polyol blend comprising, in the absence of amine initiated polyols:

a) a first polyether polyol that is the reaction product of one or more alkylene oxides and a compound selected from the group consisting of aliphatic diols, aliphatic triols, pentaerythritol, water in an amount sufficient to form a diol upon reaction with alkylene oxide, and mixtures thereof, said first polyether polyol having a functionality of from about 2 to 4, a hydroxyl number of from about 100 to 500, and an equivalent weight of from about 110 to 560;

b) a second polyether polyol that is the reaction product of one or more alkylene oxides and a compound selected from the group consisting of carbohydrates, a mixture of carbohydrates, and a mixture of one or more carbohydrates and one or more compounds selected from the group consisting of aliphatic diols, aliphatic triols, water in an amount sufficient to form a diol upon reaction with alkylene oxide, and mixtures thereof, said second polyether polyol having an average functionality of from about 4 to 8, a hydroxyl number of from about 200 to 600, and an equivalent weight of from about 90 to 280, wherein said first and second polyether polyols are present in said blend in a ratio by weight of said first polyol to said second polyol of from about 1.5:1% to 2.5:1 sufficient for preparation of dimensionally stable polyurethane foams in the absence of halogenated hydrocarbon blowing agents;

c) one or more urethane catalysts;

d) one or more foam stabilizing agents; and e) water present in an amount of from about 2 to 8 percent by weight based upon the weight of said blend.

35. The polyether polyol blend of claim 34, said blend having an average functionality of from about 3 to 5, an average hydroxyl number of from about 200 to 400, and an average equivalent weight of from about 140 to 280.

36. The blend of claim 35, said blend having an average molecular weight of from about 600 to 800.

37. The blend of claim 34 further comprising one or more alkylphenol alkoxylates in an amount of from about 2 to 20 percent by weight based upon the total weight of said blend.

38. The blend of claim 34 wherein said alkylphenol alkoxylates comprise at least one nonylphenol ethoxylate.

39. The blend of claim 34 wherein said foam stabilizing agents comprise one or more surfactants present in an amount of from about 0.2 to 5 percent by weight based upon the total weight of said blend.

40. The blend of claim 34 wherein said foam stabilizing agents comprise one or more silicone surfactants present in an amount of from about 0.2 to 5 percent by weight based upon the total weight of said blend.

41. The blend of claim 34 further comprising at least one cell opening agent in an amount of from about 0.01 to 10.0% by weight of said mixture.

42. The blend of claim 41 wherein said cell opening agent is a liquid, unsaturated, hydrocarbon free of moieties that are reactive with isocyanate groups, and wherein said agent has a molecular weight of from about 800 to 10,000.

43. The blend of claim 42 wherein said cell opening agent has a molecular weight of from 1,000 to 4,000 and is selected from the group consisting of polybutadiene and polyoctenylene.

44. A polyol blend comprising, in the absence of amine initiated polyols:

a) water in an amount of from about 2 to 8 percent by weight based upon the total weight of said blend;

b) a first polyol that is the reaction product of glycerol and an alkylene oxide selected from the group consisting of ethylene oxide, propylene oxide, and mixtures thereof, said first polyether polyol having a functionality of about 3, a hydroxyl number of about 238, and an equivalent weight of about 236; and c) a second polyol that is the reaction product of a mixture of glycerol, an alkylene oxide selected from the group consisting of ethylene oxide, propylene oxide, and mixtures thereof, water in an amount sufficient to form a diol upon reaction with alkylene oxide, and a carbohydrate selected from the group consisting of sucrose, sorbitol, and mixtures thereof, said second polyether polyol having a functionality of from about 4 to 6, a hydroxyl number of about 525, and an equivalent weight of about 107, wherein said first and second polyols are present in said blend in a ratio by weight of said first polyol to said second polyol of from about 1.5:1 to 2.5:1 sufficient for preparation of dimensionally stable polyurethane foams in the absence of halogenated hydrocarbon blowing agents.

45. The blend of claim 44 wherein said first polyether polyol has a molecular weight of about 600 to 700 and is present in an amount of from about 60 to 70 percent by weight of said blend, and wherein said second polyether polyol has a molecular weight of about 550 and is present in an amount of from about 30 to 40 percent by weight of said blend.

46. The blend of claim 45 further comprising one or more urethane catalysts, surfactants, water, and nonylphenol ethoxylates.

* * * * *

UNITED STATES PATENT AND TRADEMARK OFFICE
CERTIFICATE OF CORRECTION

PATENT NO. : 5,690,855

DATED : November 25, 1997

INVENTOR(S) : Nichols et al.

It is certified that error appears in the above-identified patent and that said Letters Patent is hereby corrected as shown below:

Column 13, line 4, "1.5:1%" should be -- 1.5:1 --.

Signed and Sealed this

Seventeenth Day of February, 1998

*Attest:*

BRUCE LEHMAN

*Attesting Officer*     *Commissioner of Patents and Trademarks*